United States Patent

Nam et al.

[11] Patent Number: 6,081,535
[45] Date of Patent: Jun. 27, 2000

[54] STM-16 NETWORK-NODE INTERFACE IN AN ATM SWITCH AND THE FAULT DIAGNOSING METHOD THEREOF

[75] Inventors: Hong Soon Nam; Yool Kwon; Hong Shik Park, all of Daejeon, Rep. of Korea

[73] Assignees: Electronics and Telecommunications Research Institute, Daejeon; Korea Telecom, Seoul, both of Rep. of Korea

[21] Appl. No.: 08/966,857

[22] Filed: Nov. 10, 1997

[30] Foreign Application Priority Data

Nov. 27, 1996 [KR] Rep. of Korea .................. 96-58217

[51] Int. Cl.[7] ............................................ H04J 12/56
[52] U.S. Cl. ........................ 370/466; 370/242; 370/395
[58] Field of Search ................................ 370/419, 469, 370/463, 466, 465, 242, 395

[56] References Cited

U.S. PATENT DOCUMENTS

| | | | |
|---|---|---|---|
| 5,204,857 | 4/1993 | Obara | 370/395 |
| 5,341,376 | 8/1994 | Yamashita | 370/466 |
| 5,359,600 | 10/1994 | Ueda et al. | 370/466 |
| 5,857,092 | 11/1999 | Nakamura et al. | 395/500 |

OTHER PUBLICATIONS

Leo Nederlof et al., "A NEw Distributed Restoration Algorithm to Protect ATM Meshed Networks against Link and Node failures", International Switching Symposium, Apr. 1995, vol. 2, pp. 398–402.

B. Edmaier et al., "Alignment Server for Hitless Path-–Switching in ATM Networks", International Switching Symposium, Apr. 1995, vol. 2, pp. 403–407.

Primary Examiner—Douglas W. Olms
Assistant Examiner—Ken Vanderpuye
Attorney, Agent, or Firm—Jacobson, Price, Holman & Stern, PLLC

[57] ABSTRACT

The invention is to provide an STM-16 Network-Node Interface(NNI) which is capable of exactly checking whether a fault is generated on any station when the VC-4 AU received from a remotely located station has the fault, by checking the incoming data streams and communication with the remote node using the still unused values of APS bytes, thereby further enhancing the reliability thereof, which comprising duplicate physical layer processing blocks for processing a physical layer to provide a plurality of simplex ATM layers, and an ATM layer controller for controlling the processing condition of each of the ATM layers processed by the ATM layer processing means, to thereby processed information to the microprocessor; and ATM layer processing block for processing the ATM layers to a plurality of ATM cells.

4 Claims, 3 Drawing Sheets

STM-16 NETWORK-NODE INTERFACE IN AN ATM SWITCH AND THE FAULT DIAGNOSING METHOD THEREOF

BACKGROUND OF THE INVENTION

1. Field of the Invention

The present invention relates to an STM(Synchronous Transfer Mode)-16 Network-Node Interface(NNI) and the fault diagnosing method thereof, which is speedily capable of checking whether a fault is occurred at a local station or a remotely located destination station during the data communication between the destination station and the local station, thereby processing the fault location to achieve an improved operation and maintenance of the STM-16 NNI on-demand.

2. Description of the Prior Art

There have been proposed various apparatuses and methods for channel dual switching of multiplex sections. One of examples has been introduced to alleviate phase difference invoked by different phase delay based on a difference between two paths; and to minimize data loss and duplication induced by a frame delay difference between the two paths during a channel switching, when Network-Node Interface(NNI) frames is transmitted via the two different paths in the multiplex section, to thereby prevent instantaneous disconnection from entailing(See, Japanese Patent Application No. 5-23520). In another, a switching information transmitting method and channel switches, as described in Japanese Patent Application No. 5-321757, has been introduced to implement auto-switching at terminals of two multiplex sections, by transmitting automatic-protection switching bytes K1 and K2 on Section Overheads(SOH) through Path Overhead(POH); transforming the bytes K1 and K2; and transmitting the bytes to different stations.

The multiplex section protection(MSP) functions, at the ends of a multiplex section, make requests for and give acknowledgements of switch action by using the MSP bytes that are K1 and K2 bytes. The K1 byte indicates a request of a channel for switch action. Bits 1–4 of the byte indicate the type of request and bits 5–8 indicate the number of the channel which is to be protected. In ITU-T Recommendation G.783, there are 4 unused values in the types of request. The STM-16 signal consits of sixteen VC-4 AUGs or four VC-4-4C AUGs.

In the conventional approaches, however, when an error is generated at each dependent AUG signal contained in the multiplex sections, since the error information must be transmitted through the Path Overhead, it is difficult to transfer information to other station when corresponding path has a fault.

Referring to a reference published by B. Edmaier, W. Fischer, A. Klug, Siemens, entitled "Alignment Server for Hitless Path-Switching in ATM Networks, ISS'95, Germany", VP/VC alignment server(VAS) has been introduced to constrain the loss of ATM cells and data duplication depending on a delay difference between two paths from causing, during path-switching in Asynchronous Transfer Mode(ATM) networks, by synchronizing the two paths during the switching, on-demand.

However, The VAS described above suffers from the disadvantage that even if it is capable of detecting a fault state. i.e., the state of a received signal and a transmitted signal during the generation of the fault, but it is difficult to check whether any station has the fault.

In the conventional approaches, the fault state and its degree of multiplexed AUG transmitted on the STM-16 frame through the Section Overhead(SOH) and the Path Overhead(POH) thereof are detected, and informed to the destination station. However, it suffers from the disadvantage that it is difficult to correctly discriminate the fault location occured, and further, the error on the Path Overhead may be determined as a path fault due to the hindrance of a circuit incorporating therein, thereby leading to the degradation in reliability.

In addition, when a fault is generated in an AUG signal during the data transmission and reception, boards installed on both the destination and local stations should be alternatively exchanged for new boards until the state of the transmission and reception is normal, which may, in turn, lead to degrade the efficiency in operation and maintenance applications.

SUMMARY OF THE INVENTION

It is, therefore, a primary object of the invention to provide a reliable STM-16 Network-Node Interface and the fault diagnosing method thereof which is correctly capable of determining a fault generated location by utilizing automatic-protection switching bytes of a multiplex section, without the use of Path Overheads of corresponding VC-4 administrative unit group(AUG), when a VC(virtual channel)-4 AUG received from a remotely located destination station has a fault, and then remove the fault to prevent data loss on-demand, thereby further enhancing the reliability thereof.

In accordance with one aspect of the present invention, there is provided an STM-16 Network-Node Interface for data communicating between a remotely located destination station and a local station, which comprises: duplicate physical layer processing blocks for processing a physical layer consisting of the STM-16 frame inputted through one of relay links to provide a plurality of Asynchronous Transfer Mode(ATM) layers; and an ATM layer processor for processing the plurality of ATM layers inputted thereto from the physical layer processing blocks to a plurality of ATM cells.

Preferably, the duplicate physical layer processing blocks acting as working physical layer processor or protection physical layer processor according to status thereof includes a converter for converting the STM-16 frame signal inputted thereto from the destination station in an optical form through the relay link into digital electric signal; an STM-16 frame terminal, which is connected to the converter, for receiving the converted STM-16 frame at the converter, and demultiplexing the same into 16 VC(virtual channel)-4 administrative unit groups; a buffer, which disables when the duplicate physical layer processing blocks are acted as protection physical layer processor, for selecting the 16 VC-4 administrative unit groups outputted from the STM-16 frame terminal, and for temporally storing the same, when the duplicate physical layer processing blocks are acted as working physical layer processor, and in response to a control signal provided from a microprocessor, for delivering the same to each ATM layer processor within the ATM layer processor; and a fault diagnosing circuit, in response to a fault diagnosing requirement signal provided from the microprocessor, for selecting a VC-4 administrative unit group with a fault when the fault is occurred on a transmitted signal and performing a fault diagnostic process on t he selected VC-4 administrative unit group.

Preferably, the fault diagnosing circuit includes a VC-4 administrative unit group selector, in response to the fault diagnosing requirement signal provided thereto from the microprocessor, for selecting the VC-4 administrative unit group with the fault from the STM-16 frame terminal and the buffer, VC-4 frame monitor for monitoring a VC-4 Path Overhead(POH), a Section Overhead(SOH) and the reception condition of the ATM cells contained in the VC-4 administrative unit group with the fault; and a status controller for controlling the processing condition of each of the ATM layers processed by the ATM layer processing means, to thereby processed information to the microprocessor.

In accordance with another aspect of the present invention, there is provided a fault diagnosing method, for use in an STM-16 Network-Node Interface, for diagnosing a fault, when the fault is generated during data communication between a remotely located destination station and a local station, which comprising the steps of: detecting, when a received signal of ith VC-4 administrative unit group(AU) at the local station is in a fault state, corresponding VC-4 administrative unit group with the fault, wherein i is a positive integer; checking the condition of STM-16 multiplex section of the local station, and generating a state diagnosing requirement signal for the ith VC-4 administrative unit group to the destination station, if the condition of the STM-16 multiplex section of the local station is in a normal state, diagnosing the received signal of the ith VC-4 administrative unit group at the local station; receiving the state diagnosing requirement signal of the ith VC-4 administrative unit group, and checking whether the STM-16 multiplex section of the local station is normal or not; diagnosing the state of the ith VC-4 administrative unit group of the local station if the STM-16 multiplex section of the local station is in a normal state; informing state information of the ith VC-4 administrative unit group of the local and destination stations to the host processor, if the state of the ith VC-4 administrative unit group of the local station is in the normal state; delivering error information representing that the ith VC-4 administrative unit group of the local station is in the fault state, if the ith VC-4 administrative unit group at the local station is in a fault state; and applying normal information representing that the ith VC-4 administrative unit group of the local station and the transmission condition of the destination station is in the normal state to a host processor, if not so.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
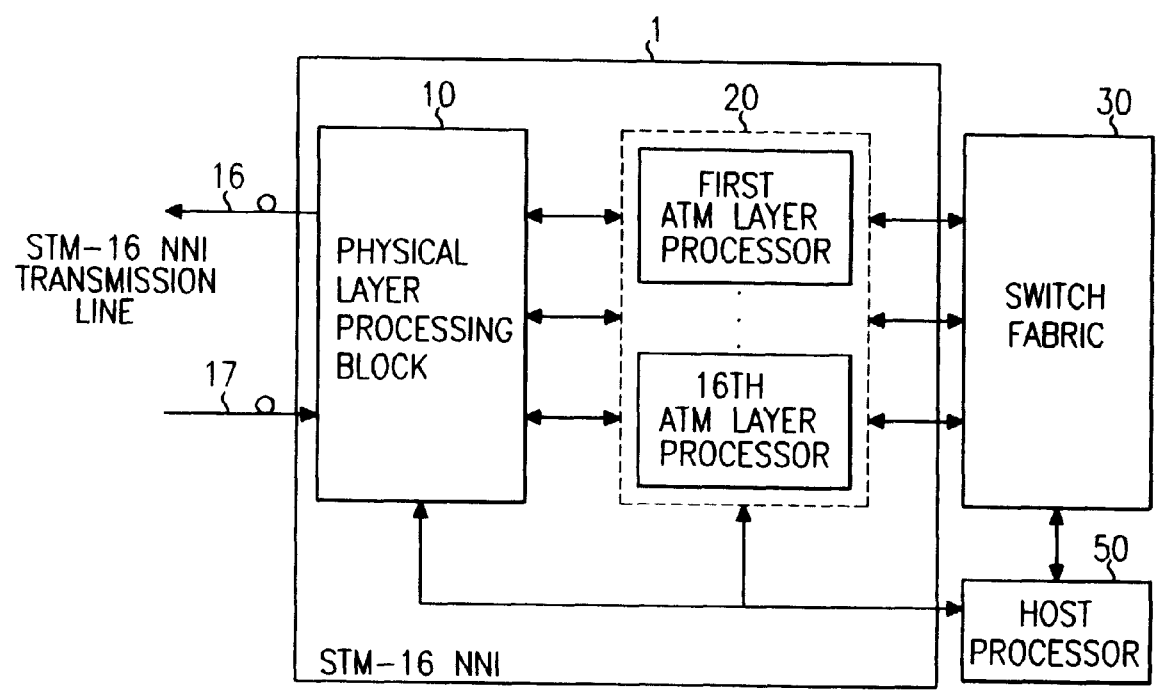
FIG. 1 depicts a schematic block diagram showing a STM-16 Network-Node Interface in accordance with a preferred embodiment of the present invention.

Referring to FIG. 1, there are shown a block diagram depicting an STM-16 Network-Node Interface in accordance with a preferred embodiment of the present invention.

As shown in FIG. 1, when a fault is generated on any VC(virtual channel)-4 Administrative Unit Group(AUG ) in a normally operating relay, the STM-16 Network-Node Interface for performing data communication between a remotely located station(destination station) and a local station monitors a received signal and a transmitted signal from/to corresponding VC-4 AUG to automatically check the station generated the fault, and informs the detected station to an operator or a host processor. In addition, when there is no fault, it performs a periodic monitoring on all VC-4 AUG s to enhance the reliability of the operation and maintenance.

The STM-16 Network-Node Interface 1 is located between duplicate switch fabrics 30 and two pairs of STM-16 relay links 16 and 17, one is working link and the other is protection link.

The STM-16 Network-Node Interface 1 comprises a pair of duplicate STM-16 physical layer processing blocks 10 with a 1+1 architecture and 16 ATM layer processing blocks 20 with a simplex architecture.

The physical layer processing blocks 10 receive the incoming signal through the STM-16 relay links from a remote node and only working physical layer processing block 10 transfer the signals to the switch fabrics 30. On the other hand, the physical layer processing blocks 1 simultaneously transmit the outgoing signals from the switch fabrics 30 to the remote station through the working and protection links. The ATM layer processor 20 is located between the line interface part and the switch fabrics 30. The ATM layer processor 20 offers ATM layer functions and a switch fabric interface function.

The inventive STM-16 Network-Node Interface 1 comprises a pair of STM-16 relay links 16 and 17 for performing the transmission and reception of STM-16 frame signal for the destination station, a physical layer processing block 10, an ATM layer processing block 20 including 16 ATM layer processors, a microprocessor 15, a switch fabrics 30 and a host processor 50.

Figure 2:
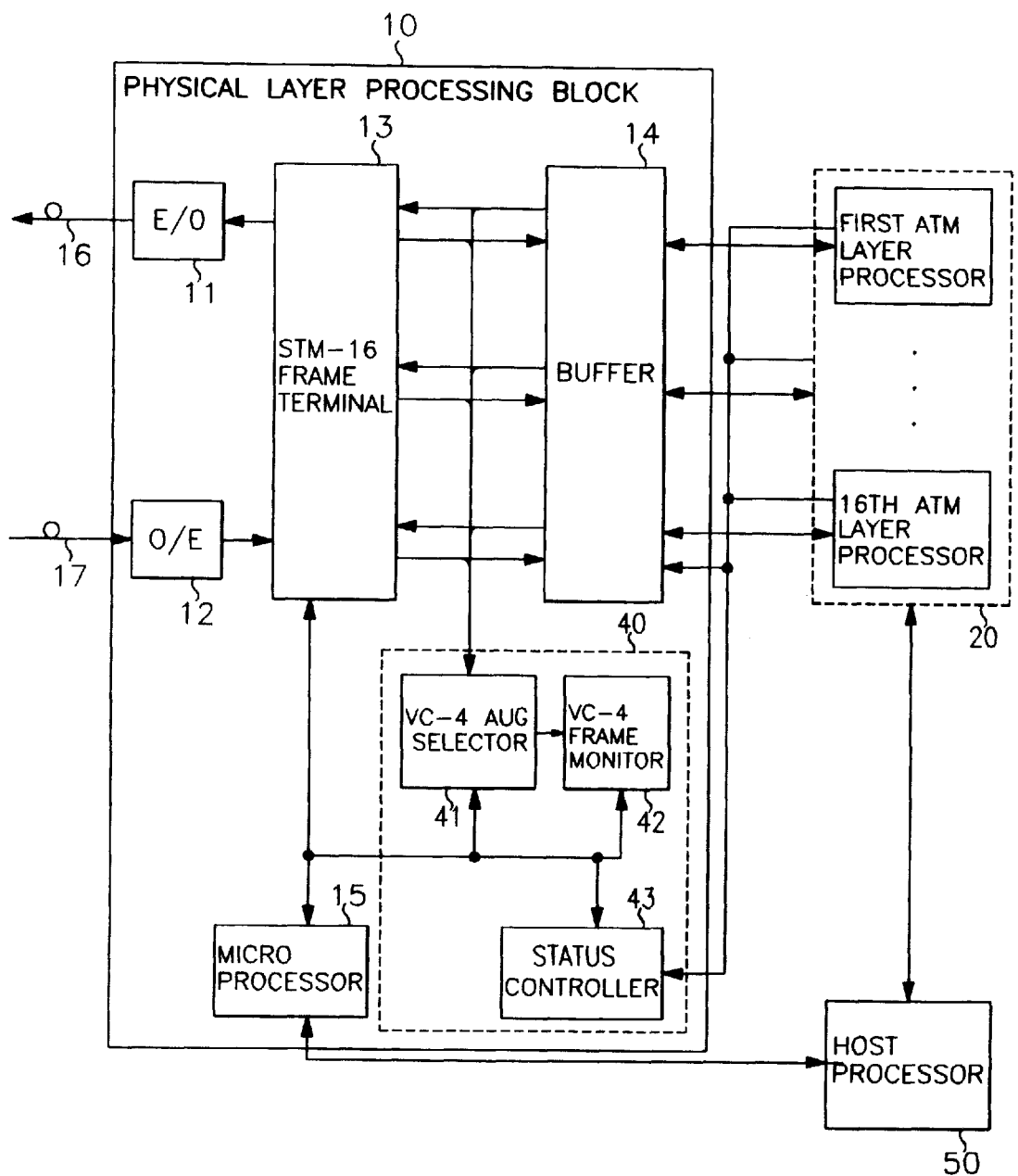
FIG. 2 shows a physical layer processing block to find fault location in a STM-16 NNI.

As shown in FIG. 2, the physical layer processing block 10 includes a pair of an O/E converters 11 and 12 for converting the STM-16 frame signal inputted thereto from the destination station in an optical form into digital electric signal, an STM-16 frame terminal 13, which is connected to the pair of converters 11 and 12, for identifying each Overhead contained in the inputted STM-16 frame signal to generate STM-16 Payloads, a buffer 14 for temporally storing the STM-16 Payloads outputted from the STM-16 frame terminal 13 to furnish same to each processor in the ATM layer processing block 30, a fault diagnosing circuit 40 for checking whether a fault is generated at any station and a microprocessor 15 for controlling each element within the physical layer processing block 10.

The fault diagnosing circuit 4o includes a VC-4 administrative unit group(AUG) selector 41, in response to a fault diagnosis requirement provided thereto from the microprocessor 15, for selecting a corresponding VC-4 administrative unit group from the STM-16 frame terminal 13 and the buffer 14; a VC-4 frame monitor 42 for monitoring the VC-4 Path Overhead(POH),and the reception condition of ATM cells, for checking faults such as loss of pointer (LOP), loss of c ell delineation (LCD) and the number of discarded cells due to more than on bit error in the cell header, and for evaluating error performance by checking bit interleaved parity; and a status controller 43 for controlling the processing condition of each of the ATM layers in the ATM layer processing block 30, and for controlling the duplicate status of the pysical layer processing blocks 10.

At the inventive STM-16 Network-Node Interface(NNI) with the above construction, if any VC-4 administrative unit group and the ATM cells have a fault due to the fault of the local station, the STM-16 NNI informs information that the VC-4 administrative unit group in the local station is in a fault state to the destination station. And if signal inputted thereto from the destination station is in the fault state, the STM-16 NNI informs the fault diagnosis requirement to the destination station and at the same time determinate whether the received signal is in the fault state or not by using the fault diagnosing circuit 40 to inform determinated result to an user or a host processor.

To be more specific, in the physical layer processing block 10 presented in FIG. 2, an STM-16 frame signal with an optical form is fed to the STM-16 frame terminal 13 through the O/E converter 12, which converting the frame signal inputted thereto via the relay link 17 into a digital electric signal to furnish the converted electric signal to the STM-16 frame terminal 13. The STM-16 frame terminal 13 detects Section Overheads contained in the STM-16 frame provided from the O/E converter 12, demultiplexes STM-16 Payloads contained therein and transfer same to the buffer 14. At the buffer 14, the 16 VC-4 administrative unit groups provided from the STM-16 frame terminal 13 are temporally stored therein and then dispatched to each of the ATM layer processors within the ATM layer processing block 20, in response to a control signal C inputted thereto from the microprocessor 15. At the ATM layer processing block 20, the 16 VC-4 administrative unit groups are processed to generate a multiplicity of ATM cells to the switch 40. Further, the ATM layer processing block 20 receives signal to be transferred to the destination station from the switch 40 and relays the same to the buffer 14 in the physical layer processing block 10.

Thereafter, the STM-16 frame terminal 13 multiplexs the 16 VC-4 administrative unit groups provided thereto from the buffer 14 into the STM-16 frames and provides the multiplexed information together with SOHs to the O/E converter 11 which converting an inputted electric signal into an optical signal. Thereafter, the converted optical signal is transmitted to the destination station through the relay link 16 in STM-16 transmission format.

In this case, when a fault is generated at the STM-16 relay links, the physical layer processing block 10 in the STM-16 NNI checks the fault on the link based on the STM-16 Section Overhead, and the ATM layer processing block 20 checks a fault of the VC-4 administrative unit group based on the Path Overhead of the VC-4 administrative unit group.

When a fault is generated between the terminal of the STM-16 multiplexer section in the physical layer processing block 10 and the terminal of the VC-4 frame in the ATM layer processing block 20, the inventive fault diagnosing circuit 40 is capable of detecting the fault, for instance, ATM layer faults.

Hereinafter, a description will be made as to the operation of the fault diagnosing circuit 40.

First, the VC-4 administrative unit group(AU) selector 21 incorporated in the fault diagnosing circuit 40, in response to a fault diagnosing requirement signal provided thereto from the microprocessor 15, selects a VC-4 AU with a fault, i.e., ith VC-4 administrative unit group signal which is transmitted between the STM-16 frame terminal 13 and the buffer 14, and provides the same to the VC-4 frame monitor 42, wherein i is a positive integer. The VC-4 frame monitor 42 monitors the fault state of the VC-4 administrative unit group from the VC-4 Section Overheads inputted thereto from the VC-4 administrative unit group selector 41; determinate whether the ATM cell header error and valid cells exist therein or not; and informs the resultant data, i.e., the detected data based on the Path Overheads, the ATM cell header error information and the presence/absence information of the valid cell to the microprocessor 15.

The microprocessor 15, in response to the output data provided thereto from the VC-4 frame monitor 42, generates to the destination station error information representing that the received signal of the ith VC-4 administrative unit group has the fault, if the received signal from the destination station is in the fault state. And, if the transmitted signal from the local station to the destination station is in the fault state, the microprocessor 15 provides error information representing that the transmitted signal of the ith VC-4 administrative unit group of the local station has the fault, to the destination station through the STM-16 frame terminal 13 by using the automatic-protection switching bytes K1 and K2 for the multiplex section. In ITU-T Recommendation G.783, there are 4 unused values in the types of request. The present invention uses these still unused values to detect the fault location of the VC-4 AUG in the STM-16 NNI 1. The STM-16 NNI 1 defines two types of requests; one is to indicate the incoming signal which is degraded, and the other is to inform self-side defect. The microprocessor 15 receives also processing state information for the ATM layers performed at the ATM layer processing block 20 from the status controller 44, generates the control signal for use in controlling the buffer 14, and delivers fault information detected by the VC-4 frame monitor 42, i.e., the type of the fault and the fault generation location to the host processor 50.

A detailed operation description of the inventive fault diagnosing circuit 40 will be given with reference to FIG. 3.

Figure 3:
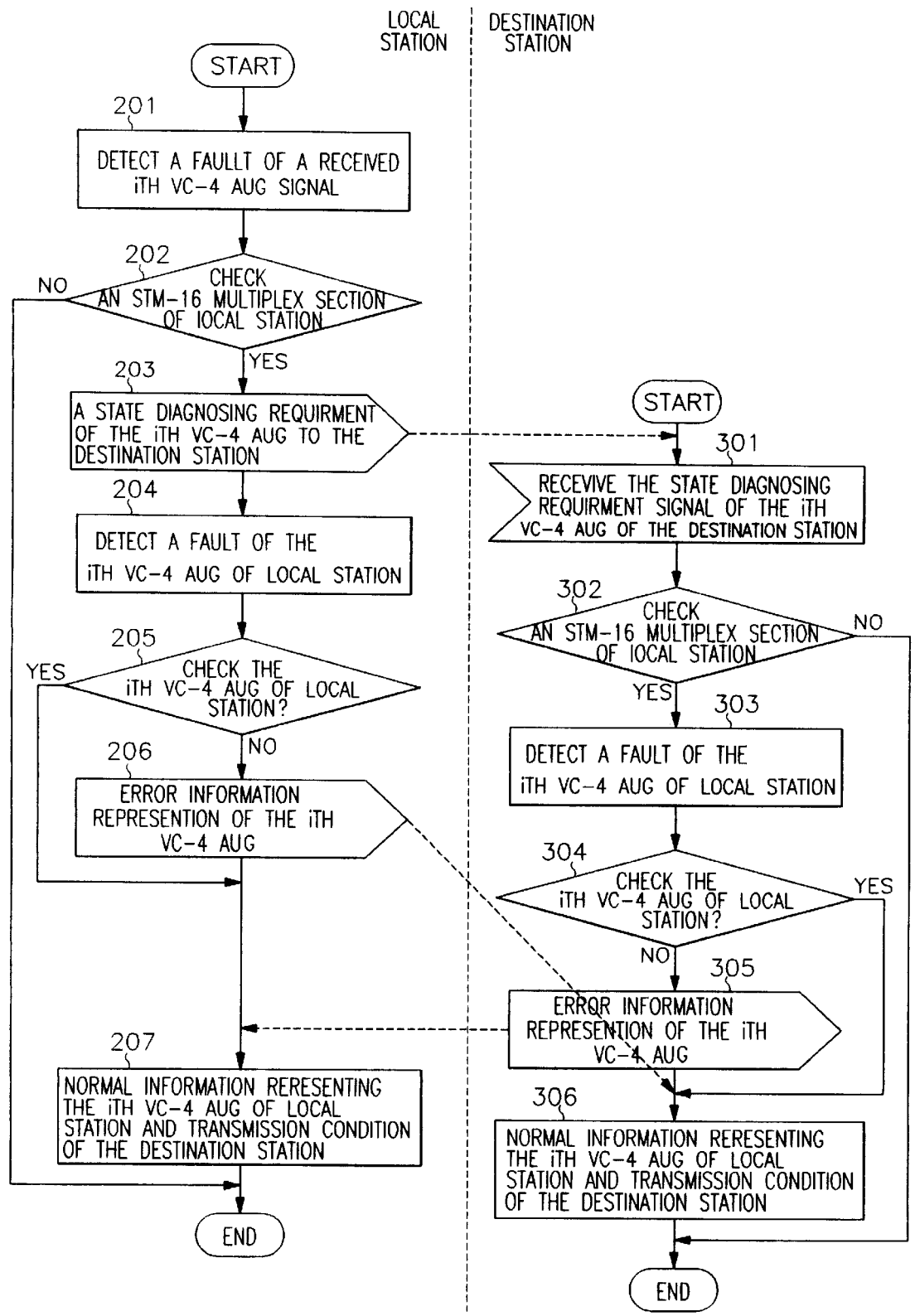
FIG. 3 illustrate a flowchart explaining a method for detecting a fault location of a VC-4 administrative unit group(AU) by using the inventive STM-16 Network-Node Interface.

As shown in FIG. 3, in step S201, at the local station, when a received signal of ith VC-4 administrative unit group(AUG) is in a fault state, the microprocessor detects the condition of STM-16 multiplex section of the local station. In step S202, if the condition of STM-16 multiplex section of the local station is normal, the step proceeds to step S203 wherein the microprocessor generates a state diagnosing requirement signal for the ith VC-4 administrative unit group to the destination station, through the use of the automatic-protection switching bytes K1 and K2 of the multiplex section.

Multiplex section protection(MSP) function provides protection for the STM-N signal against failure within a multiplex section. The MSP function communicates with the corresponding far end MSP function to coordinate the switch action, via a bit-oriented protocol defined for the K1 byte of the MSOH. The lower 4 bits of the K1 byte are defined as the types of request and the remaining 4 bits are defined as the channel numbers. In ITU-T Recommendation, there are 4 unused values in the types of request.

The present invention uses these still unused valus to detect the falut location of the VC-4 AUG in the STM-16 NNI 1. The STM-16 NNT 1 defines two types of requests; one is to indicate the incoming signal which is degraded and the other is to inform self-side defect. When the incoming signal is SF or SD, the STM-16 NNI send this information to the side defect signal to the remote node. In this cases, the succeeding four bits indicate the VC-4 AUG number instead of the channel number.

In this case, at step S204, while the destination station determinate the state of signal transmitted therefrom to the local station in response to the state diagnosing requirement signal for the ith VC-4 administrative unit group provided thereto from the local station, the local station checks whether the received signal of the ith VC-4 administrative unit group is in the fault state with the help of the inventive fault diagnosing circuit 20. At step S205, when the VC-4 administrative unit group of the local station has the fault, the step proceeds to step S206 wherein error information representing that the ith VC-4 administrative unit group of the local station is in the fault state is furnished to the destination station. At step S205, when the VC-4 administrative unit group of the local station is in the normal state, the step proceeds to step S207 wherein normal information representing that the ith VC-4 administrative unit group of the local station and the transmission condition of the destination station is in the normal state are furnished to the operator or the host processor.

On the other hand, at step S301, when the state diagnosing requirement signal of the ith VC-4 administrative unit group for the destination station is received, the step proceeds to step S302 wherein the fault diagnosing circuit checks whether the STM-16 multiplex section of the local station is in the normal or not. At the step S302, if it is in the normal, the step proceeds to step S303 wherein the state of the ith VC-4 administrative unit group of the local station is determinated. At step S304, when the state of the ith VC-4 administrative unit group of the local station is in the normal state, the step proceeds to step S306 wherein state information of the ith VC-4 administrative unit group of the local and destination stations is relayed to the operator. However, at step S304, when the VC-4 administrative unit group of the local station has the fault, the step proceeds to step S305 wherein the error information representing that the ith VC-4 administrative unit group of the local station is in the fault state is furnished to the destination station. In addition, when the error information for the ith VC-4 administrative unit group in the destination station is inputted therefrom to the local station, or the state of the ith VC-4 administrative unit group of the local station is in the fault state, the error information is also brought into the host processor. When the fault location is also not exactly determinated, the fault state is broadcast to the host processor to allow the operator to appropriately remedy it.

By the above procedure, the fault diagnosing circuit 20 in accordance with the present invention monitors the Path Overheads of the received and transmitted signals, checks whether the ATM cell header error and the valid cell exist therein or not, and informs checked data to the host processor.

In accordance with the present invention, therefore, when a fault is generated during data communication between the destination station and the local station, it is possible to transmit error information detected by the inventive fault diagnosing circuit to the destination station on-demand, by using the unused values of the automatic-protection switching bytes K1 and K2 of the multiplex section, and determinate a type of the fault and a location generated the fault through the fault diagnostic process itself, to thereby enhance the reliability thereof, and further achieve a reduction in the operating and maintaining cost of the stations.

While the present invention has been described with reference to the particular embodiments, it will be apparent to those skilled in the art that various changes and modifications may be made without departing from the spirit and scope of the invention as defined in the following claims.

What is claimed is:

1. An STM-16 Network-Node Interface for data communicating between a remotely located destination station and a local station, which comprises:

a duplicate physical layer processing means for processing an STM-16 frame signal inputted through one of a plurality of relay links to provide a plurality of Asynchronous Transfer Mode (ATM) layers; and a simplex ATM layer processing means for processing the plurality of ATM layers inputted thereto from the physical layer processing means to form a plurality of ATM cells;

wherein said physical layer processing means includes:

a converting means for converting the STM-16 frame signal inputted thereto from the destination station in an optical form through one of the relay links into digital electric signal;

an STM-16 frame terminal means, which is connected to the converting means, for receiving the converted STM-16 frame, and demultiplexing the same into 16 VC (virtual channel)4 administrative unit groups;

a buffer means, which disables when the duplicate physical layer processing means is acting as a protective physical layer processor, for selecting the 16 VC-4 administrative unit groups outputted from the STM-16 frame terminal means, and for temporally storing the same, when the duplicate physical layer processing means is acting as a working physical layer processor, and in response to a control signal provided from a microprocessor, for delivering the same to each ATM layer processor within the ATM layer processing means; and a fault diagnosing means, in response to a fault diagnosing requirement signal provided from the microprocessor, for selecting a VC-4 administrative unit group with a fault when the fault has occurred on a transmitted signal and performing a fault diagnostic process on the selected VC-4 administrative unit group.

2. The STM-16 Network-Node Interface according to claim 1, wherein said fault diagnosing means includes:

a VC-4 administrative unit group selecting means, and in response to the fault diagnosing requirement signal provided thereto from the microprocessor, for selecting the VC-4 administrative unit group with the fault from the STM-16 frame terminal means and the buffer means;

a VC-4 frame monitoring means for monitoring a VC-4 Path Overhead (POH), a Section Overhead (SOH) and the reception condition of the ATM cells contained in the VC-4 administrative unit group with the fault; and a status controlling means for controlling the processing condition of each of the ATM layers processed by the ATM layer processing means, and for controlling the duplicate physical layer processing means, to thereby process information to the microprocessor.

3. A fault diagnosing method, for use in an STM-16 Network-Node Interface, for diagnosing a fault, when the fault is generated during data communication between a remotely located destination station and a local station, which comprises the steps of:

(a) detecting, when a received signal of ith VC-4 administrative unit group (AU) at the local station is in a fault state, the ith VC-4 administrative unit group with the fault, wherein i is a positive integer;

(b) checking the condition of an STM-16 multiplex section of the local station, and generating a state diagnosing requirement signal for the ith VC-4 administrative unit group to the destination station, if the condition of the STM-16 multiplex section of the local station is in a normal state, (c) diagnosing the receiving signal of the ith VC-4 administrative unit group at the local station; and (d) delivering error information representing that the ith VC-4 administrative unit group of the local station is in the fault state, if the ith VC-4 administrative unit group at the local station is in a fault state; otherwise applying normal information representing that the ith VC-4 administrative unit group of the local station and the transmission condition of the destination station is in the normal state to a host processor.

4. The method according to claim 3, further comprising after step(b), the steps of;

(b1) receiving the state diagnosing requirement signal of the ith VC-4 administrative unit group, and checking whether the STM-16 multiplex section of the local station is normal or not;

(b2) diagnosing the, state of the ith VC-4 administrative unit group of the local station if the STM-16 multiplex section of the local station is in a normal state; and (b3) informing state information of the ith VC-4 administrative unit group of the local and destination stations to the host processor, if the state of the ith VC-4 administrative unit group of the local station is in the normal state.

* * * * *